United States Patent
Feikema

[15] 3,651,900
[45] Mar. 28, 1972

[54] ANTI-SKID BRAKE

[72] Inventor: Orville A. Feikema, 18844 Wildwood Avenue, Lansing, Ill. 60438

[22] Filed: Mar. 16, 1970

[21] Appl. No.: 19,770

[52] U.S. Cl. .................. 188/181 T, 188/72.4, 303/21 CH
[51] Int. Cl. ........................................................ B60t 8/16
[58] Field of Search ................... 188/18 A, 72.4, 181 T; 303/21 CH

[56] References Cited

UNITED STATES PATENTS

| | | | |
|---|---|---|---|
| 2,781,871 | 2/1957 | Altekruse | 188/181 T X |
| 2,999,567 | 9/1961 | Adams | 188/181 T |
| 3,369,635 | 2/1968 | Davis | 188/181 T |
| 3,490,566 | 1/1970 | Von Keszycki | 188/181 T |

Primary Examiner—Duane A. Reger
Attorney—Wolfe, Hubbard, Leydig, Voit & Osann

[57] ABSTRACT

An antiskid brake in which a brake disc is resiliently attached to a vehicle wheel. hen braking torque forces are applied to the disc brake, a deformation in the resilient member and consequent movement of associated parts occurs. This movement controls the amount of frictional braking torque force exerted upon the brake disc in a manner such that the frictional braking torque does not exceed that which may be transmitted by the vehicle wheel to the road surface without excessive wheel slip and the consequent lockup and skid.

6 Claims, 6 Drawing Figures

INVENTOR.
ORVILLE A. FEIKEMA,
BY
Wolfe, Hubbard, Leydig, Voit & Osann
ATTORNEYS.

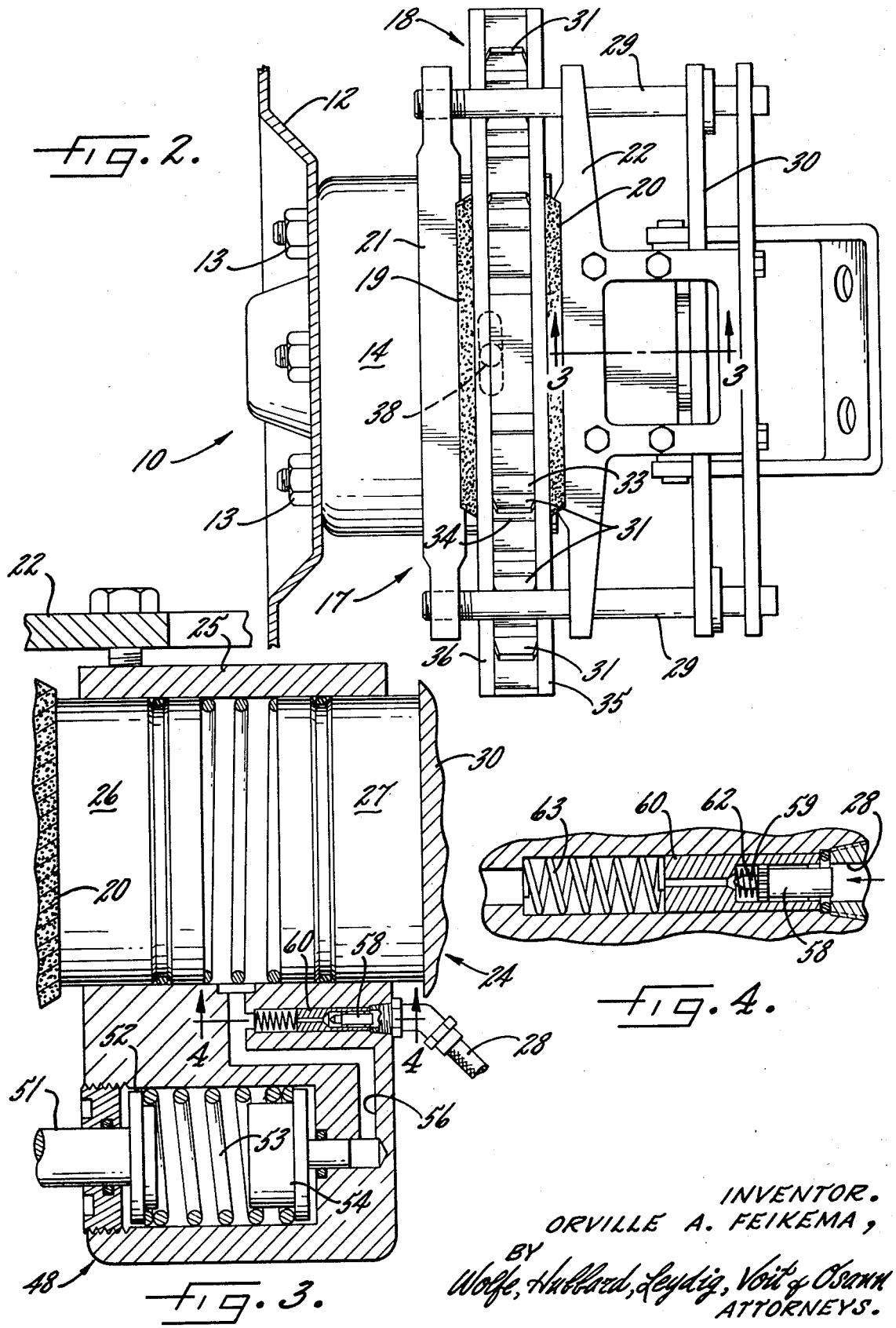

INVENTOR.
ORVILLE A. FEIKEMA,
BY
Wolfe, Hubbard, Leydig, Voit & Osann
ATTORNEYS.

ANTI-SKID BRAKE

DESCRIPTION OF THE INVENTION

This invention relates generally to anti-skid brakes, and more particularly concerns an anti-skid brake mechanism wherein the braking torque force applied to a brake disc causes movement of parts within the brake mechanism so as to limit the amount of braking force applicable to the brake system to an amount less than that which would cause wheel lockup and a consequent uncontrolled vehicle skid.

GENERAL BACKGROUND OF THE INVENTION

When a wheeled vehicle which is moving rapidly over a generally planar surface must be halted quickly, a severe braking condition arises. As the vehicle operator gradually increases his braking effort, a slipping condition may occur, wherein there is a transition from a condition of relatively great static friction between the traversed road surface and the contact patch of the periphery of the rolling vehicle wheel, to a condition of relatively less kinetic friction. Continued increases in the application of braking force to the wheel produces increased wheel slipage until a skidding or sliding condition develops wherein the wheel ceases to rotate at all while the vehicle skids across the traversed surface. During such skid, retarding forces applicable to the vehicle are reduced to a point less than the maximum available through the use of the braking system; further, directional control of the vehicle is lost, because a wheeled vehicle depends upon the rotation of its wheels for steerability. Further, lateral stability is decreased, resulting in greater likelihood of a sideways skid. Such skid cannot be corrected because of the previously mentioned lost of steerability.

Tests have indicated that the maximum retarding forces applicable to a wheeled vehicle are applied when braking forces are exerted upon the vehicle wheels to produce a wheel slip of 5 to 15 per cent; that is, the vehicle will be brought to its quickest and shortest possible stop when the brakes thereof are applied so as to cause the vehicle wheels to rotate with a peripheral speed of 5 to 15 per cent less than the speed of the vehicle.

The operator of the vehicle is, however, seldom able to achieve this optimum braking effect simply by operating the braking system and measuring the results by eye. This is particularly true under emergency conditions. Under such emergency conditions, it has been found that vehicle operators are prone to operate the braking system in such manner as to produce 100 percent slip, that is, a complete skid is developed, with the consequent undesirable results discussed above.

A number of general types of anti-skid braking systems have been proposed in response to this problem. One such type has relied for its operation upon the amount of reactive force applied to the brake shoes or pads by the rotating brake drum or disc. With this type of device, however, a full skid condition must develop in order that brake pressure can be automatically released. Under such conditions, static friction, rather than kinetic, is present between the brake shoe or pad and the brake drum or disc while kinetic friction conditions exist between the sliding wheel and the traversed surface. The frictional forces developed between the wheel and traversed surface are less than the frictional forces between the brake drum or disc and the brake shoe or pad which cause the wheel to cease rotation and to assume a "locked up" position. Under such conditions, a signal is transmitted to another portion of the braking system to release braking pressure. While this device will not permit prolonged skidding conditions to exist, such device does not detect excessive slipping. Maximum retardation and control of the vehicle are not, therefore, achieved. In addition, brake pressure must be relieved for some time in order to allow the wheel to again regain rotational velocity corresponding to the velocity of the vehicle before the retarding braking forces can be again applied.

It is another object of this invention to provide a brake apparatus which prevents excessive wheel slipage as well as wheel skidding so that a maximum retarding force may be applied by the braking system to halt a moving vehicle.

It is another object of this invention to provide an anti-skid braking mechanism independently operable upon each wheel of a moving vehicle so that a maximum retarding force may be applied independently to each wheel of the vehicle, without regard to the maximum force applicable at any given moment to any other vehicle wheel.

It is a further object of this invention to provide an anti-skid brake device of the above kind which is operable when the vehicle wheels are rotating in a reverse, as well as a forward, direction.

Still another is to provide an anti-skid braking device as characterized above which is simple in design, rugged in construction, dependable in operation, and minimal in repair and service requirements.

Other objects and advantages of the invention will become apparent upon reading the following detailed description and upon reference to the drawings, in which:

FIG. 2 is a top plan view showing the arrangement whereby the brake pads associated with the invention may be applied to the brake disc to provide the requisite vehicle retardent forces;

FIG. 3 is a fragmentary sectional view taken along line 3—3 of FIG. 1 showing in further detail portions of the hydraulic system used therein;

FIG. 4 is a fragmentary sectional view taken along line 4—4 of FIG. 3 and showing in greater detail portions of the hydraulic braking apparatus;

While the invention will be described in connection with a preferred embodiment, it will be understood that I do not intend to limit the invention to that embodiment. On the contrary, I intend to cover all alternate use, modifications, and equivalents as may be included within the spirit and scope of the invention.

Figure 1:
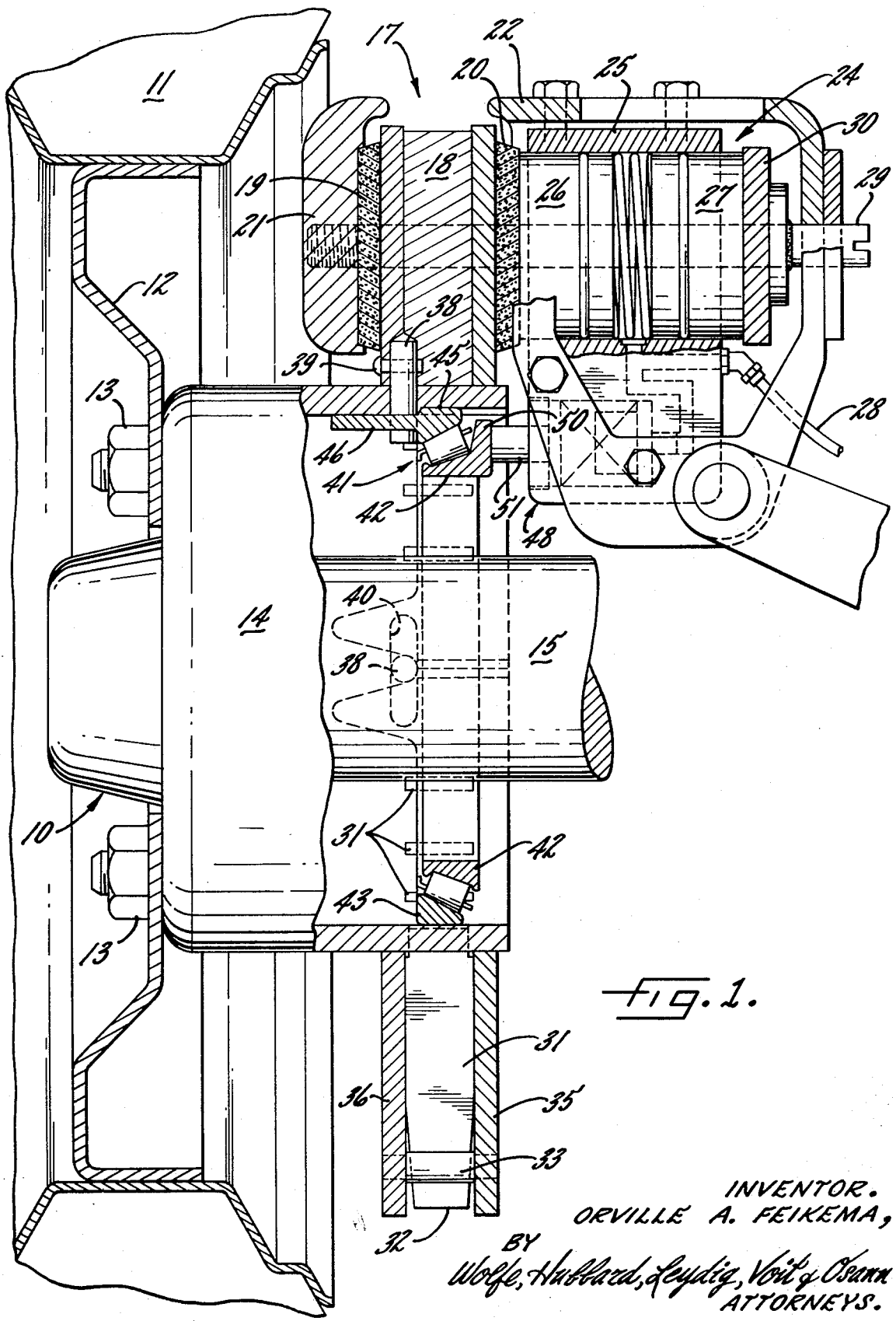
FIG. 1 is a sectional view showing the overall arrangement of a wheel axle, and braking mechanism, embodying the present invention.

Turning first to FIG. 1, in accordance with the invention, there is shown an illustrative wheel assembly 10 embodying the present invention. The illustrated wheel assembly comprises a tire 11 mounted on a wheel 12 which is, in turn, secured by lugs 13 or other suitable means to a rotatable hub 14 disposed on a vehicle axle 15. For retarding rotation of the wheel assembly 10, a disc brake assembly 17 is carried by the hub 14. The brake assembly 17 includes a brake rotor, here illustrated as a disc 18, and brake pads 19 and 20 which may be urged into frictional engagement with the periphery of the brake disc 18 by a pair of relatively movable brake calipers 21 and 22. It will be understood that the invention is equally applicable to drum type brake and wheel assemblies.

Initial braking force is applied to the disc 18 through the pads and calipers by a double acting hydraulic cylinder assembly 24. As best seen in FIGS. 2 and 3, this first braking means comprises a cylinder 25 within which are located two opposed pistons 26 and 27. When hydraulic pressure is introduced into the cylinder 25 and between the two pistons 26 and 27 through a conduit 28 from an appropriate source (not shown) controlled by the vehicle operator, the piston 26 forces the brake pad 20 into engagement with the disc 18. The opposite piston 27 exerts pressure on a cross bar 30, which in turn, tensions rods 29, thereby drawing the opposite caliper 21 and associated brake 19 into engagement with the opposite of the brake disc 18. The revolving disc 18 is thus retarded in its rotation by the squeezing action of the brake pads 19 and 20, and the wheel rotation slowed.

Figure 5:
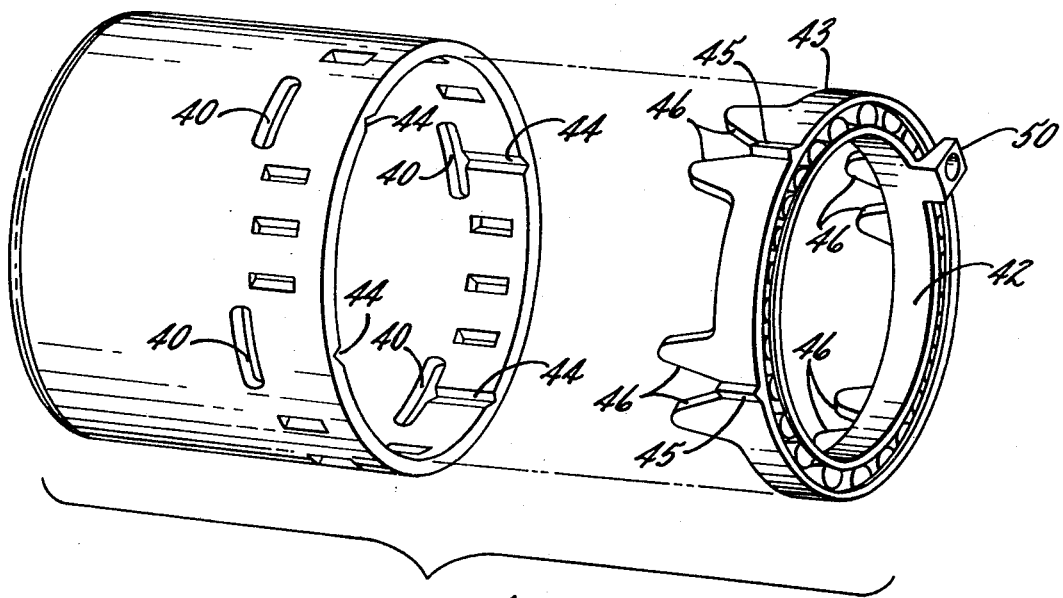
FIG. 5 is an exploded perspective view of portions of the brake hub utilized in the braking system.
Figure 6:
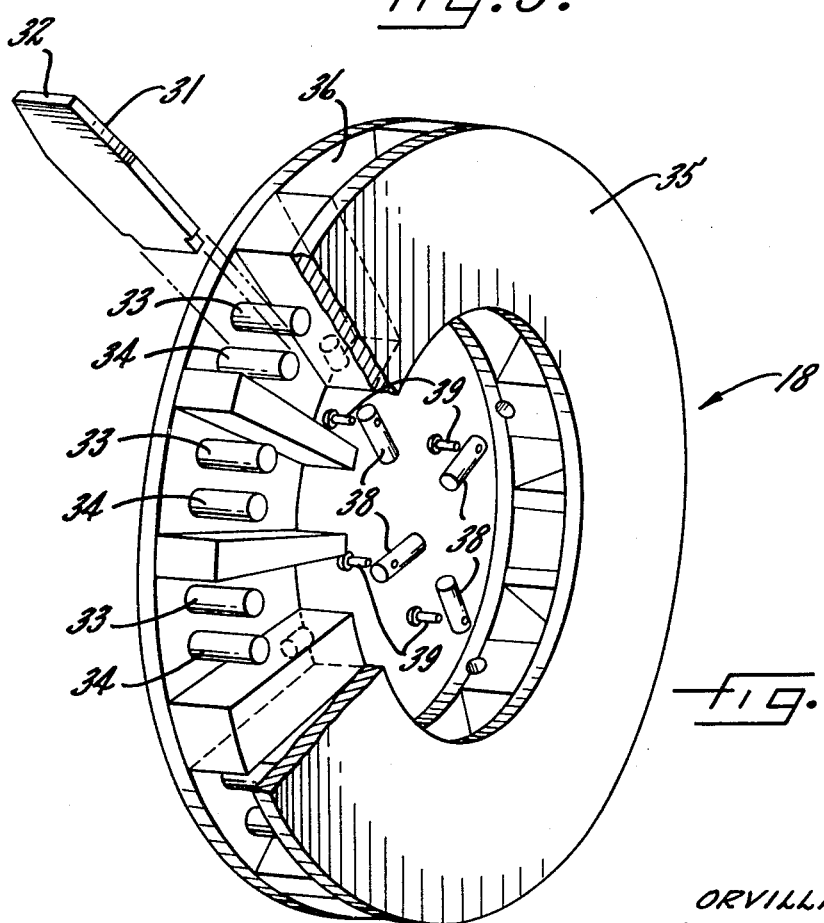
FIG. 6 is a partially exploded perspective view in partial section showing the arrangement of the interior of the brake disc used in the illustrated braking systems.

The brake disc 18 is journaled upon the hub 14 to allow limited relative rotational displacement therebetween in response to braking torque, as best seen in FIGS. 1 and 6. A plurality of cantilever springs 31 are radially fixed to the hub 14, as by press fitting the interior ends of the spring 31 into sockets provided in the hub 14, or by other convenient means. The radially extending cantilever springs are inserted at their free ends 32 between respective pairs of retaining pins 33 and 34 which are secured between sides 35 and 36 of the brake disc 18. As seen in FIGS. 1 and 5, slots 40 are provided upon the hub 14 to allow retaining pins 38 to move about the periphery of the hub 14 with disc 18. These retaining pins 18 are radially secured to the interior of the disc 18 by cross pins or rivets 39 or other convenient means. It will thus be understood that, as the disc 18 is retarded in its motion by the described braking apparatus, the disc 18 will displace angularly about the periphery of the hub 14, the amount of displacement being proportional to the braking forces applied, and that the pins 38 will be correspondingly displaced in slots 40.

For optimizing the braking forces applicable to the wheel assembly, linkage means including an antifriction bearing assembly 41 is located within the hub 14. The bearing 41 includes an inner race 42 and an outer race 43, the outer race 43 being keyed to the hub 14 in such manner that it is constrained to rotate with the hub 14, but is free to slide axially therein. This keying is preferably accomplished by providing elongated grooves 44 upon the inner surface of the hub 14. Corresponding projections 45 are provided for engagement with the grooves 44, the grooves and projections being formed to permit the described axially motion and to prohibit rotative motion of the outer race 43 within the hub 14.

For engaging the camming retaining pins 38, V-shaped surfaces 46 are also provided upon the outer race 43, as best seen in FIG. 5. When the disc 18 is angularly shifted upon the hub 14, the camming retaining pins 38, in shifting about the hub surface within the slots 40, engage the camming surfaces 46, and force the anti-friction bearing assembly 41 to move axially, or to the right as seen in FIG. 1. It will be noted that such camming action and axial movement will be caused whenever the disc 18 rotates about the hub 14 in either direction. As will be seen, the anti-skid feature of this braking system thus operates whenever the wheel is rotated in either a relatively forward or reverse direction.

A second hydraulic cylinder 48 is provided for transforming the above-described axial motion of the anti-friction bearing into skid-preventing hydraulic pressures, by modifying the amount of brake force applied by the brake calipers 21 and 22. As illustrated in FIGS. 1, 3 and 5, a finger 50 carried by the inner race contacts the plunger 51 of a piston 52 located inside this second cylinder 48. A lost motion linkage, which is illustrated here as including a compression spring 53, is located inside the cylinder 48 and resiliently transmits motion of the piston 52 to a second piston 54. It will be seen that, as illustrated in FIG. 3, linear motion of the finger 50 and plunger 51, caused by the braking-torque-induced angular displacement of the disc 18 on the hub 14 will force the second piston 54 to the right. Such motion of the piston 54 will, in turn, force hydraulic fluid located in second conduit 56 into the first cylinder 24. The addition of such additional hydraulic fluid to the first cylinder 24 merely creates further pressure in the hydraulic cylinder 24, resulting in further braking pressure being applied to the brake disc 18 by the calipers 21 and 22.

At the point at which the tire 11 and wheel assembly 10 which is affixed thereto begins to skid upon the traversed surface, no more torque twist will be developed between the brake disc 18 and hub 14. No further motion of the finger 50 and plunger 51 will occur, and the piston 54 will therefore force no additional hydraulic fluid into the cylinder 24. The pressure in this cylinder 24 will therefore remain at a constant level, thereby applying a constant torque twist to the brake disc 18.

Should a skid develop, as may happen, for example, if the braking vehicle encounters an ice patch on the traversed surface, considerably less torque twist will be imparted to the resiliently mounted brake disc 18 by the wheel. Under such circumstances, the resilient cantilever springs 31 will bias the brake disc 18 toward its normal position on the hub 14, thereby allowing the finger 50 and plunger 51 to move into the hub, or to the left as seen in FIG. 1. Pressure on the second piston 54 will be lessened, and hydraulic fluid will be allowed to flow down the second passage 56 and out of the first cylinder 24, thereby lessening the pressure on the main brake pistons 26 and 27. Braking action upon the disc 18 will thereby be lessened, permitting the wheel assembly to obtain optimum slipping and braking conditions.

Provision for wear of the brake pads and for application of a hydraulic pressure sufficient to urge the friction pads 19 and 20 into a light wiping engagement with the disc 18 is made by the inclusion of a shiftable plug within the conduit 28. Such wiping action keeps the braking surfaces clean and dry, enhancing the effectiveness of the brake system. As shown in FIG. 4 and elsewhere, fluid in the conduit 28 is allowed to seep around the periphery of the small piston 58 and needle valve 59 through the interior of the large piston 60 and ultimately into the interior of the first cylinder 24. Thus, expansion of the fluid cavity located within the cylinder 24 resulting from wear of the brake pads and consequent outward movement of the pistons 26 and 27 is compensated for by the described fluid seepage. When, however, the brake system is activated by application of increased fluid pressure in the conduit 28, the small piston 58 is forced into the large piston 60 or to the left as seen in FIG. 4, thereby closing the needle valve 59. The small piston 58 and the large piston 60, now acting as a unit, operate to transmit fluid pressure exerted upon the collective right end of the pistons to the fluid located at the left side of these pistons. When the vehicle operator determines that no further braking of the vehicle is required, and removes the application of hydraulic pressure from the conduit 28, and the pistons 58, or 60 are again biased to their open positions, or to the right, as shown in FIG. 4, by the spring biasing means 62 and 63.

In view of the above, it can be seen that the braking system of the present invention prevents excessive wheel slipage and skidding and does so at each wheel, independently of the action of other vehicle wheels.

The following is claimed as invention:

1. In a vehicle having at least one wheel and a brake member for applying a brake torque to the wheel, the combination of,
    a. a brake rotor.
    b. resilient means for mounting the brake rotor on the wheel to allow relative rotational displacement between the rotor and the wheel, the magnitude of said displacement being proportional to the magnitude of braking torque twist applied to the rotor,
    c. first braking means for applying an initial braking force on the brake rotor member, and
    d. second braking means acting in response to the magnitude of movement of the brake rotor member relative to the wheel for modifying the amount of braking force applied by the brake member to the brake rotor.
2. A vehicle brake assembly comprising in combination,
    a. a rotatable hub adapted to carry a wheel,
    b. a brake disc carried by the hub,
    c. resilient means for securing the disc to the hub to allow relative rotational displacement therebetween in response to braking torque,
    d. linkage means including a rotatable bearing for translating relative movement between the disc and hub in response to braking torque into linear movement at a fixed point relative to a vehicle,
    e. first hydraulic braking means for applying an initial braking force on the disc, and f. second hydraulic braking means responsive to movement of said linkage means with respect to the vehicle in response to braking torque for applying an additional braking force to the disc.

3. Apparatus as defined in claim 2, in which said first and second hydraulic braking means include a common caliper having opposed friction pads engageable with a periphery of the disc, and a common hydraulic cylinder assembly for applying braking forces to the friction pads, said first hydraulic means including a first conduit leading to the cylinder assembly from a source of hydraulic pressure controlled by a vehicle operator, said first conduit having a calibrated chamber having a shiftable plug for permitting a calibrated amount of hydraulic fluid to be expelled through the conduit whereupon the flow is interrupted by the plug encountering one end of the calibrated chamber, and said second hydraulic brake means including a piston and cylinder connected to the cylinder assembly by a second conduit; said piston being connected to the linkage means for fluid-expelling movement upon movement of the linkage means in response to braking torque.

4. Apparatus as defined in claim 3 in which said piston of said second hydraulic brake means is connected to the linkage means by a lost-motion linkage including a compression spring for urging a piston into a rest position removed from the linkage means.

5. Apparatus as defined in claim 3 in which said plug includes a one-way check valve for allowing fluid to escape from the hydraulic cylinder assembly, and bleed means for allowing a controlled seepage of hydraulic fluid into the hydraulic cylinder assembly, said assembly further including a compression spring for urging the friction pads into a light wiping engagement with the disc.

6. Apparatus as defined in claim 2 in which said linkage means includes an antifriction bearing having inner and outer races, said outer race being keyed to the hub for axial movement, cam and follower means for translating relative rotational movement of the disc on the hub into axial movement of the bearing outer race, and a finger carried by the inner race and retained in a stationary position relative to the vehicle for translating axial movement of the bearing to the second hydraulic cylinder means.

* * * * *